(No Model.)
W. SMITH, D. MARKS & R. WATSON.
TOOL FOR CUTTING KEYWAYS IN WHEEL HUBS.
No. 475,352. Patented May 24, 1892.
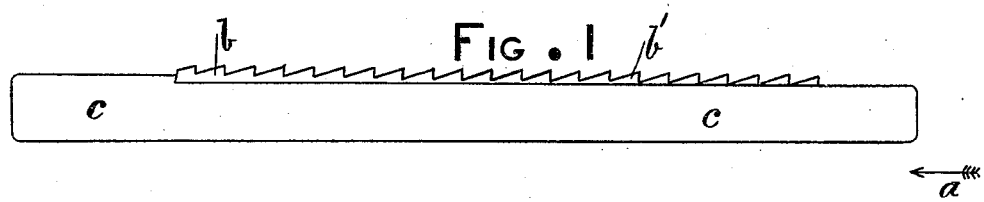
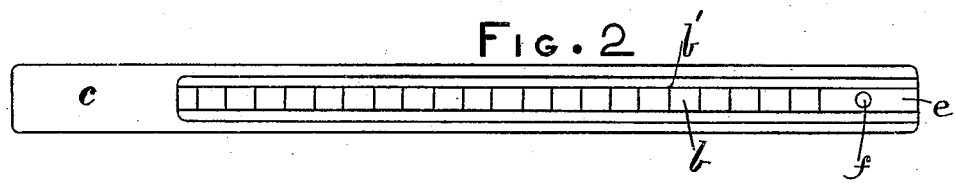
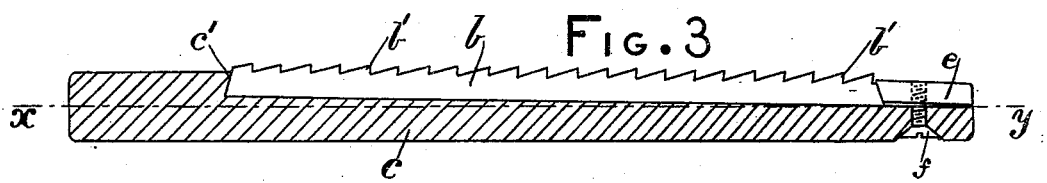
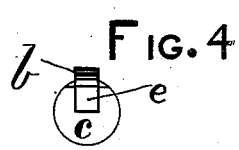 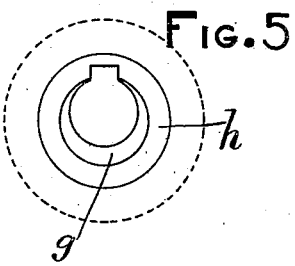 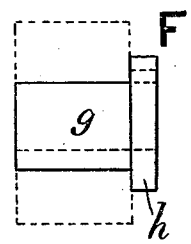
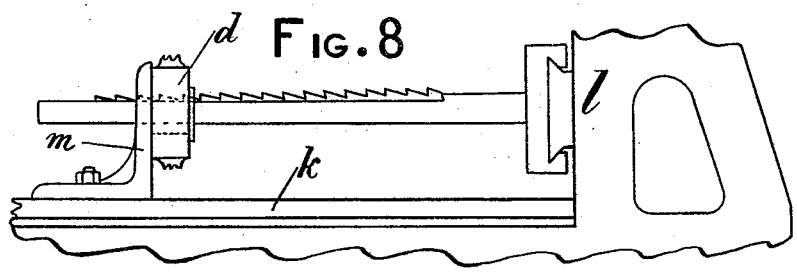
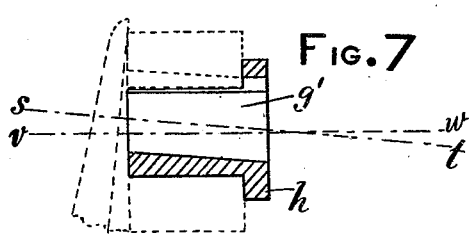
Witnesses
John Whitehead
Harry Ellison
Inventors
William Smith
David Marks
Robert Watson
Per Samuel Hey
Attorney.

UNITED STATES PATENT OFFICE.

WILLIAM SMITH, DAVID MARKS, AND ROBERT WATSON, OF KEIGHLEY, ENGLAND.

TOOL FOR CUTTING KEYWAYS IN WHEEL-HUBS.

SPECIFICATION forming part of Letters Patent No. 475,352, dated May 24, 1892.

Application filed October 28, 1890. Serial No. 369,570. (No model.)

*To all whom it may concern:*

Be it known that we, WILLIAM SMITH, DAVID MARKS, and ROBERT WATSON, subjects of the Queen of Great Britain, residing at Keighley, in the county of York, England, have invented a new and useful Tool for Cutting Keyways in the Hubs of Wheels, of which the following description, together with the drawings appended, is a specification.

Our invention relates to means for cutting keyways in wheel-hubs, or for similar operations; and it consists of certain parts in combination, the same being used in connection with a common metal-planing machine, or any similar machine having a movable table and stationary or fixed head, or movable head and fixed table, by which means the process of forming or cutting keyways is greatly facilitated without the expense and inconvenience of having a separate machine for this purpose.

Figures 1 and 2 are respectively side and top views of our cutter or tool. Fig. 3 is a longitudinal section of a portion of the tool, but shows the other parts intact. Fig. 4 is an end view of parts shown by Fig. 1 when seen in the direction indicated by arrow $a$. Figs. 5, 6, and 7 are detailed views of parts hereinafter described. Fig. 8 is a side view of a portion of a metal-planing machine, showing the method of using the same for operating our cutter or tool.

Similar letters refer to similar parts throughout the several views.

The object of our invention is attained by forming a serrated cutter-blade $b$ of the width that it is desired to make the keyway or groove in the hub to be operated upon, said blade $b$ having a depth (see Fig. 3) proportionate to its width. This blade $b$ we make to fit within a groove formed in a shaft or carrier $c$, which is of the diameter of or shape and size in cross-section of the hole or opening in the hub $d$, Fig. 8, in connection with which the keyway or groove has to be cut or formed, into and through which opening said carrier is made to fit and pass. To hold the blade $b$ within its said groove in the carrier $c$, its outer ends are somewhat beveled, so that while one of them passes beneath or enters the undercut part $c'$ of the carrier $c$ the other is held by the piece $e$, being tightly screwed or drawn down upon it by the screw $f$, said piece $e$ being formed to suit said outer end of the blade $b$, and also to allow a slight amount of yield or adjustment, by which means said blade $b$ will be more securely held within its carrier $c$.

The depth of the groove in the carrier $c$ for the reception of the blade $b$ is greater toward one end thereof than toward the other, or, in other words, it is so formed that when the blade $b$ is inserted therein the outer edges of its cutting teeth or serrations near or approaching the end $y$ are nearer the axial center (shown by chain-line $x\ y$) than are those approaching the end $x$, (the difference in the extent of said distances from said axial center being equal to the depth of the keyway to be cut,) so that when the end, as that approaching $y$, is inserted into the opening in the hub $d$ to be operated upon and the cutter $b$, together with its carrier $c$, is being forced therethrough, each tooth $b'$ is made to cut its proportionate share, and when it has been finally pushed through the keyway or groove will be formed of the depth required. If it is desired to cut a keyway in the hub of a wheel having a central hole or opening larger in diameter than is the cutter's carrier $c$, we employ a bush $g$ which is sufficiently large in diameter to fill the said opening in the hub, and eccentrically in and through this bush $g$ we form an opening of the size and shape to receive the cutter's carrier $c$, the said opening in the bush $g$ being made so much out of center thereof as will leave a groove or slot therein sufficiently wide for the blade $b$ to pass therethrough, while on the outer end thereof the flange $h$ is formed to hold the same within the opening in the hub (shown in broken lines, Figs. 5 and 6) during the process of cutting the keyway.

When a tapering keyway is to be formed, a bush $g'$ (see Fig. 7) is employed. This bush $g'$ has its eccentrically-formed opening made at an angle to its axial center, as is indicated by the broken lines $s\ t$ (representing the axial center of the opening) and $v\ w$ (representing the axial center of the bush $g'$.)

The carrier $c$ is formed perfectly straight (although its tapering groove, together with the necessary flattened part on its outer surface to facilitate the making of such groove, as shown by Figs. 3 and 1, might somewhat make it appear tapering) and even throughout, no projection or screwed part or even recesses being made therein for the purposes of enabling the same to be operated by its motor mechanism, as none of these is required, since by bolting the bracket $m$ to the movable table $k$ of a common metal-planing machine it is only necessary to insert one outer end of said carrier $c$ into the opening in the hub $d$ and arrange the other to abut against the fixed head $l$, so that when the table $k$ has been moved to bring the bracket $m$ within a sufficient distance from the head $l$ for the cutter $b$ to have been forced through the hub $d$, the object desired is attained and the cutter $b$ and its carrier $c$ are free to be taken in hand by the operative in order to be again placed in operation after the motion of the planing-machine has been reversed and again restarted for this purpose without necessitating the cutter and its carrier to perform their return movement through the hub $d$ or the opening in the bracket $m$, an object that is greatly desired on account of the damage to the cutter when having to perform its return movement through the hub on the guide-piece, it being often greater than is sustained by the actual cutting process.

Such being the nature and object of our invention, what we claim is—

As an improved article of manufacture, the key-seat cutter herein described, comprising a cutter-carrier $c$, having a groove therein of gradually-tapering depth and undercut at one end, a fastening-piece $e$, fitting in said groove, and a cutter-blade $b$, secured by a screw passing into said fastening-piece and through said cutter-carrier and having the cutting-edges of its teeth in a line parallel with the back of the cutter-blade and its ends fitting under the undercut end of the groove in the cutter-carrier, and the fastening-piece, all substantially as herein shown and described.

WILLIAM SMITH.
DAVID MARKS.
ROBERT WATSON.

Witnesses:
SAMUEL HEY,
HARRY ELLISON.